(12) United States Patent
Kajino (10) Patent No.: US 11,308,414 B2
(45) Date of Patent: Apr. 19, 2022

(54) MULTI-STEP AHEAD FORECASTING USING COMPLEX-VALUED VECTOR AUTOREGREGRESSION

(71) Applicant: INTERNATIONAL BUSINESS MACHINES CORPORATION, Armonk, NY (US)

(72) Inventor: Hiroshi Kajino, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 738 days.

(21) Appl. No.: 16/157,529

(22) Filed: Oct. 11, 2018

(65) Prior Publication Data

US 2020/0118024 A1  Apr. 16, 2020

(51) Int. Cl.
| | |
|---|---|
| *G06N 5/02* | (2006.01) |
| *G06F 17/10* | (2006.01) |
| *H04L 25/03* | (2006.01) |
| *G06F 16/35* | (2019.01) |
| *G06N 7/08* | (2006.01) |
| *G06F 11/07* | (2006.01) |
| *G06N 20/00* | (2019.01) |
| *G06N 5/00* | (2006.01) |

(52) U.S. Cl.
CPC .......... *G06N 7/08* (2013.01); *G06F 11/0736* (2013.01); *G06F 11/0751* (2013.01); *G06F 11/0787* (2013.01); *G06N 5/00* (2013.01); *G06N 20/00* (2019.01)

(58) Field of Classification Search
CPC .......... G06N 7/08; G06N 5/00; G06N 20/00; G06N 5/003; G06F 11/0736; G06F 11/0787; G06F 17/18

USPC ........................................................ 706/1–62
See application file for complete search history.

(56) References Cited

U.S. PATENT DOCUMENTS

| | | | |
|---|---|---|---|
| 9,648,464 B1 | 5/2017 | Tran et al. | |
| 2003/0063596 A1* | 4/2003 | Arslan | ............. H04L 25/03993 370/347 |

(Continued)

FOREIGN PATENT DOCUMENTS

CN  107274009 A  10/2017

OTHER PUBLICATIONS

McElroy et al., "Multistep Ahead Forecasting of Vector Time Series", Taylor Francis Online, Journal Econometric Reviews, Oct. 2014, 4 pages, vol. 36, Issue 5.

(Continued)

*Primary Examiner* — Brandon S Cole
(74) *Attorney, Agent, or Firm* — Tutunjian & Bitetto PC; Randall Bluestone (57) ABSTRACT

Computer-implemented methods, computer program products, and systems are provided for multi-step ahead forecasting. A method includes configuring, by a processor device, a Vector Autoregression (VAR) model to generate a multi-step-ahead forecast based on previous observations. The previous observations are predictors and the multi-step-ahead forecast is a response to the predictors. The method further includes training, by the processor device, the VAR model using complex-valued weight parameters to avoid a training result relating to any of a divergence and a convergence to zero.

25 Claims, 8 Drawing Sheets

(56) References Cited

U.S. PATENT DOCUMENTS

| | | | |
|---|---|---|---|
| 2009/0150308 A1* | 6/2009 | Wang | G06K 9/723 |
| | | | 706/12 |
| 2009/0300781 A1* | 12/2009 | Bancroft | C12Q 1/6895 |
| | | | 800/13 |
| 2010/0010788 A1* | 1/2010 | De Crecy | G06F 30/20 |
| | | | 703/2 |
| 2010/0082405 A1 | 4/2010 | Shan | |
| 2010/0257133 A1 | 10/2010 | Crowe et al. | |
| 2010/0280985 A1* | 11/2010 | Duchon | G06Q 10/10 |
| | | | 706/52 |
| 2011/0028827 A1* | 2/2011 | Sitaram | A61B 5/055 |
| | | | 600/410 |
| 2011/0106743 A1* | 5/2011 | Duchon | G06F 16/35 |
| | | | 706/46 |
| 2011/0255641 A1* | 10/2011 | Lopez | H04L 25/03006 |
| | | | 375/343 |
| 2013/0030819 A1* | 1/2013 | Purnhagen | G10L 19/008 |
| | | | 704/500 |
| 2015/0100530 A1* | 4/2015 | Mnih | G06N 20/00 |
| | | | 706/25 |
| 2015/0120263 A1 | 4/2015 | Brzezicki et al. | |
| 2016/0098291 A1 | 4/2016 | Kondaveeti et al. | |
| 2019/0147300 A1* | 5/2019 | Bathen | G06K 9/6284 |
| | | | 706/12 |

OTHER PUBLICATIONS

McElroy et al., "Multistep Ahead Forecasting of Vector Time Series", Research Division Federal Reserve Bank of Louis, Working Paper Series, Sep. 2014, 29 pages.

Taieb et al., "Boosting Multi-Step Autoregressive Forecasts", Proceedings of the 31 st International Conference on Machine Learning, Jun. 2014, pp. II-1440-II-1448, pp. II-1440-II-1448, vol. 32.

* cited by examiner

MULTI-STEP AHEAD FORECASTING USING COMPLEX-VALUED VECTOR AUTOREGREGRESSION

BACKGROUND

Technical Field

The present invention generally relates to data processing, and more particularly to multi-step forecasting using complex-valued vector autoregression.

Description of the Related Art

A Vector Autoregression (VAR) is an equation, n-variable linear model in which each variable is in turn explained by its own lagged values, plus current and past values of the remaining n−1 variables. That is, Vector Autoregression (VAR(p)) is a time series model that provides a one-step-ahead forecast based on the previous p observations by learning a regression model where the past observations are predictors and the forecast is the response.

There are two main approaches for N-step-ahead forecast based on VAR models are as follows: recursive; and direct. In the recursive approach, for each future time step, the VAR model forecasts one-step-ahead based on previous forecasts and observations. In the direct approach, multiple VARs are used, where the nth VAR forecasts the Nth-step-ahead.

However, while preferable over the direct method in certain cases, the recursive model is not without deficiency. For example, regarding the recursive approach, when N is large, the recursive approach cannot make accurate forecasts because the recursive prediction results in either divergence or convergence to zero. Accordingly, there is a need for an improved VAR-based recursive approach for multi-step forecasting.

SUMMARY

According to an aspect of the present invention, a computer-implemented method is provided for multi-step ahead forecasting. The method includes configuring, by a processor device, a Vector Autoregression (VAR) model to generate a multi-step-ahead forecast based on previous observations. The previous observations are predictors and the multi-step-ahead forecast is a response to the predictors. The method further includes training, by the processor device, the VAR model using complex-valued weight parameters to avoid a training result relating to any of a divergence and a convergence to zero.

According to another aspect of the present invention, a computer program product is provided for multi-step ahead forecasting. The computer program product includes a non-transitory computer readable storage medium having program instructions embodied therewith. The program instructions are executable by a computer to cause the computer to perform a method. The method includes configuring, by a processor device, a Vector Autoregression (VAR) model to generate a multi-step-ahead forecast based on previous observations. The previous observations are predictors and the multi-step-ahead forecast is a response to the predictors. The method further includes training, by the processor device, the VAR model using complex-valued weight parameters to avoid a training result relating to any of a divergence and a convergence to zero.

According to yet another aspect of the present invention, a computer processing system is provided for multi-step ahead forecasting. The system includes a memory device for storing program code. The system further includes a processor device for running the program code to configure a Vector Autoregression (VAR) model to generate a multi-step-ahead forecast based on previous observations. The previous observations are predictors and the multi-step-ahead forecast is a response to the predictors. The processor device further runs the program code to train the VAR model using complex-valued weight parameters to avoid a training result relating to any of a divergence and a convergence to zero.

According to still another aspect of the present invention, a computer-implemented method is provided for multi-step-ahead forecasting. The method includes configuring, by a processor device, a Vector Autoregression (VAR) model to generate a multi-step-ahead forecast based on previous observations. The previous observations are predictors and the multi-step ahead forecast is the response to the predictors. The method further includes learning, by the processor device, the VAR model using a multi-step cumulative error as an objective function of the VAR model.

According to a further aspect of the present invention, a computer processing system is provided for multi-step-ahead forecasting. The system includes a memory for storing program code. The system further includes a processor device for running the program code to configure a Vector Autoregression (VAR) model to generate a multi-step-ahead forecast based on previous observations. The previous observations are predictors and the multi-step ahead forecast is the response to the predictors. The processor device further runs the program code to learn the VAR model using a multi-step cumulative error as an objective function of the VAR model.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The present invention is directed to multi-step forecasting using complex-valued Vector Autoregression (VAR). The present invention is directed to recursive types of VARs, and overcomes at least the aforementioned deficiency associated with VAR-based recursive type one-step-ahead forecast techniques.

In an embodiment, the multi-step forecasting approach of the present invention uses a multi-step cumulative error as an objective function for learning.

In an embodiment, the multi-step forecasting approach of the present invention uses a VAR(s) equipped with complex-valued weight parameters.

The multi-step cumulative error and the complex-valued weight parameters allow the present invention to overcome the deficiency of the recursive approach to one-step-ahead VAR-based prediction models.

As is known in the art, each variable entering a recursive VAR has an equation explaining its evolution based on its own lagged values, the lagged values of the other model variables, and an error term. Conventionally, the error term in a recursive VAR equation relates specifically and only to a given time step and is not cumulative across two or more time steps. In contrast to the conventional approach, the present invention uses a multi-step cumulative error that represents an error term across multiple (more than two) time steps. The cumulative error allows us to train a VAR so that it forecasts not only one-step ahead, but also multi-step ahead of the time-series; in contrast, the conventional one-step error only focuses on one-step forecast, and it does not necessarily improve multi-step forecast. Note that the cumulative error by itself does not address the aforementioned deficiency, but its combination with a complex-valued VAR does. Exemplary methods relating to the use of multi-step cumulative error are described below with respect to FIG. 4 as a standalone approach, and with respect to FIG. 6 in a hybrid approach.

Additionally, as is also known in the art, real-values weight parameters are conventionally used. In contrast to the convention approach, complex-valued weight parameters are used. When generating a forecast, the real portion of the resultant output is taken as the multi-step-ahead forecast. With the complex-valued parameters, VAR's forecasts include both real and imaginary values. Although the imaginary part is not used directly for prediction, it is used as input to successive predictions. With this auxiliary input, the complex-valued VAR can learn more complex patterns than the conventional real-valued VAR, alleviating the aforementioned deficiency. Exemplary methods relating to the use of multi-step cumulative error are described below with respect to FIG. 5 as a standalone approach, and with respect to FIG. 6 in a hybrid approach.

Figure 1:
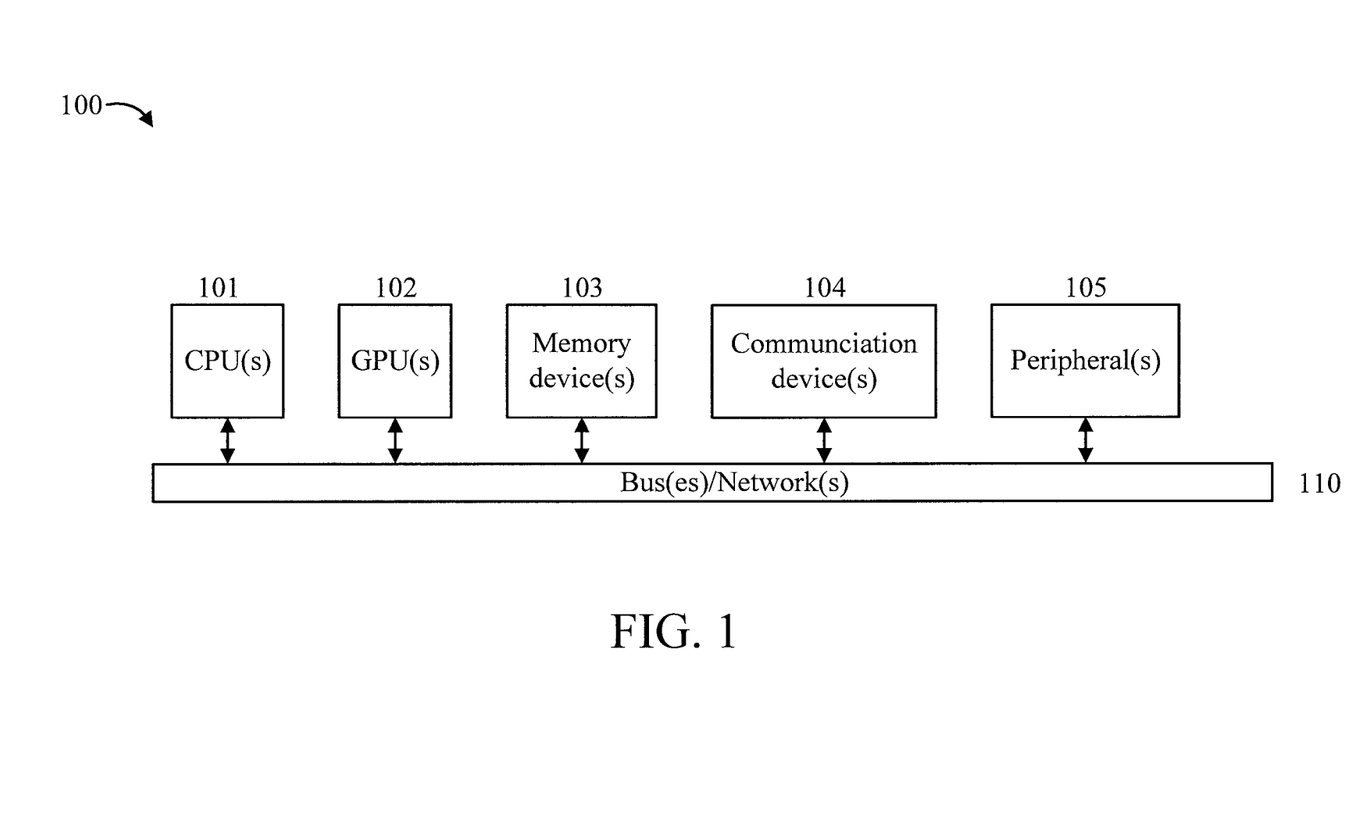
FIG. 1 is a block diagram showing an exemplary processing system to which the present invention may be applied, in accordance with an embodiment of the present invention.

FIG. 1 is a block diagram showing an exemplary processing system 100 to which the present invention may be applied, in accordance with an embodiment of the present invention. The processing system 100 includes a set of processing units (e.g., CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, an imaging device, and so forth. Elements of processing system 100 are connected by one or more buses or networks (collectively denoted by the figure reference numeral 110).

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. Further, in another embodiment, a cloud configuration can be used (e.g., see FIGS. 7-8). These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

A description will now be given regarding two exemplary environments 200 and 300 to which the present invention can be applied, in accordance with various embodiments of the present invention. The environments 200 and 300 are described below with respect to FIGS. 2 and 3, respectively. In further detail, the environment 200 includes a multi-step-ahead forecast system operatively coupled to a controlled system, while the environment 300 includes a multi-step ahead forecast system as part of a controlled system. Moreover, any of environments 200 and 300 can be part of a cloud-based environment (e.g., see FIGS. 7 and 8). These and other environments to which the present invention can be applied are readily determined by one of ordinary skill in the art, given the teachings of the present invention provided herein, while maintaining the spirit of the present invention.

Figure 2:
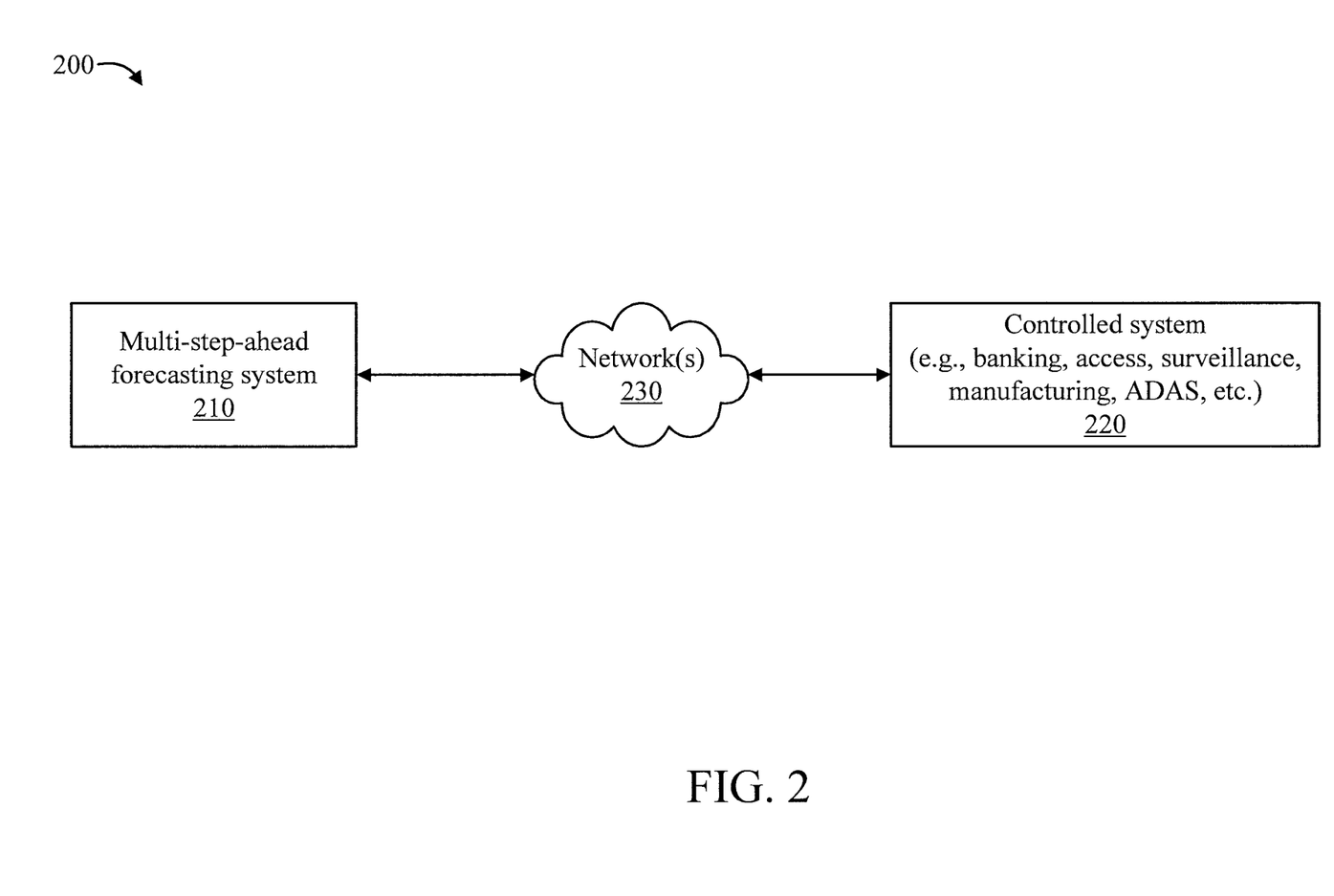
FIG. 2 is a block diagram showing an exemplary environment to which the present invention can be applied, in accordance with an embodiment of the present invention.

FIG. 2 is a block diagram showing an exemplary environment 200 to which the present invention can be applied, in accordance with an embodiment of the present invention.

The environment 200 includes a multi-step-ahead forecasting system 210 and a controlled system 220. The multi-step-ahead forecasting system 210 and the controlled system 220 are configured to enable communications therebetween. For example, transceivers and/or other types of communication devices including wireless, wired, and combinations thereof can be used. In an embodiment, communication between the multi-step-ahead forecasting system 210 and the controlled system 220 can be performed over one or more networks, collectively denoted by the figure reference numeral 230. The communication can include, but is not limited to, multi-variate time series data from the controlled system 220, and forecasts and action initiation control signals from the multi-step-ahead forecasting system 210.

The controlled system 220 can be any type of processor-based system such as, for example, but not limited to, a banking system, an access system, a surveillance system, a manufacturing system (e.g., an assembly line), an Advanced Driver-Assistance System (ADAS), and so forth.

The controlled system 220 provides data (e.g., multi-variate time-series data) to the multi-step-ahead forecasting system 210 which uses the data to make predictions (forecasts). The multi-step-ahead forecasting system 210 uses past predictions it has generated in order to make multi-step-ahead forecast of a future event.

In an embodiment, in order to make a multi-step-ahead forecast, the multi-step-ahead forecasting system 210 can use a VAR equipped with (i) multi-step cumulative error and/or (ii) complex-valued weight parameters. The use of the preceding two features advantageously overcomes the aforementioned deficiency of conventional multi-step-ahead recursive forecast techniques.

The controlled system 220 can be controlled based on a multi-step-ahead forecast generated by the multi-step-ahead forecasting system 210. For example, based on a forecast that a machine will fail in x time steps, a corresponding action (e.g., power down machine, enable machine safeguard to prevent injury/etc., and/or so forth) can be performed at t<x in order to avoid the failure from actually occurring. As another example, based on a trajectory of an intruder, a surveillance system being controlled could lock or unlock one or more doors in order to secure someone in a certain place (holding area) and/or guide them to a safe place (safe room) and/or restrict them from a restricted place and/or so forth. Verbal (from a speaker) or displayed (on a display device) instructions could be provided along with the locking and/or unlocking of doors (or other actions) in order to guide a person. As a further example, a vehicle can be controlled (braking, steering, accelerating, and so forth) to avoid an obstacle that is predicted to be in a car's way responsive to a multi-step-ahead forecast. As a yet further example, the present invention can be incorporated into a computer system in order to forecast impending failures and take action before the failures occur, such as switching a component that will soon fail with another component, routing through a different component, processing by a different component, and so forth. It is to be appreciated that the preceding actions are merely illustrative and, thus, other actions can also be performed depending upon the implementation, as readily appreciated by one of ordinary skill in the art given the teachings of the present invention provided herein, while maintaining the spirit of the present invention.

In an embodiment, the multi-step-ahead forecasting system 210 can be implemented as a node in a cloud-computing arrangement. In an embodiment, a single multi-step-ahead forecasting system 210 can be assigned to a single controlled system or to multiple controlled systems e.g., different robots in an assembly line, and so forth). These and other configurations of the elements of environment 200 are readily determined by one of ordinary skill in the art given the teachings of the present invention provided herein, while maintaining the spirit of the present invention.

Figure 3:
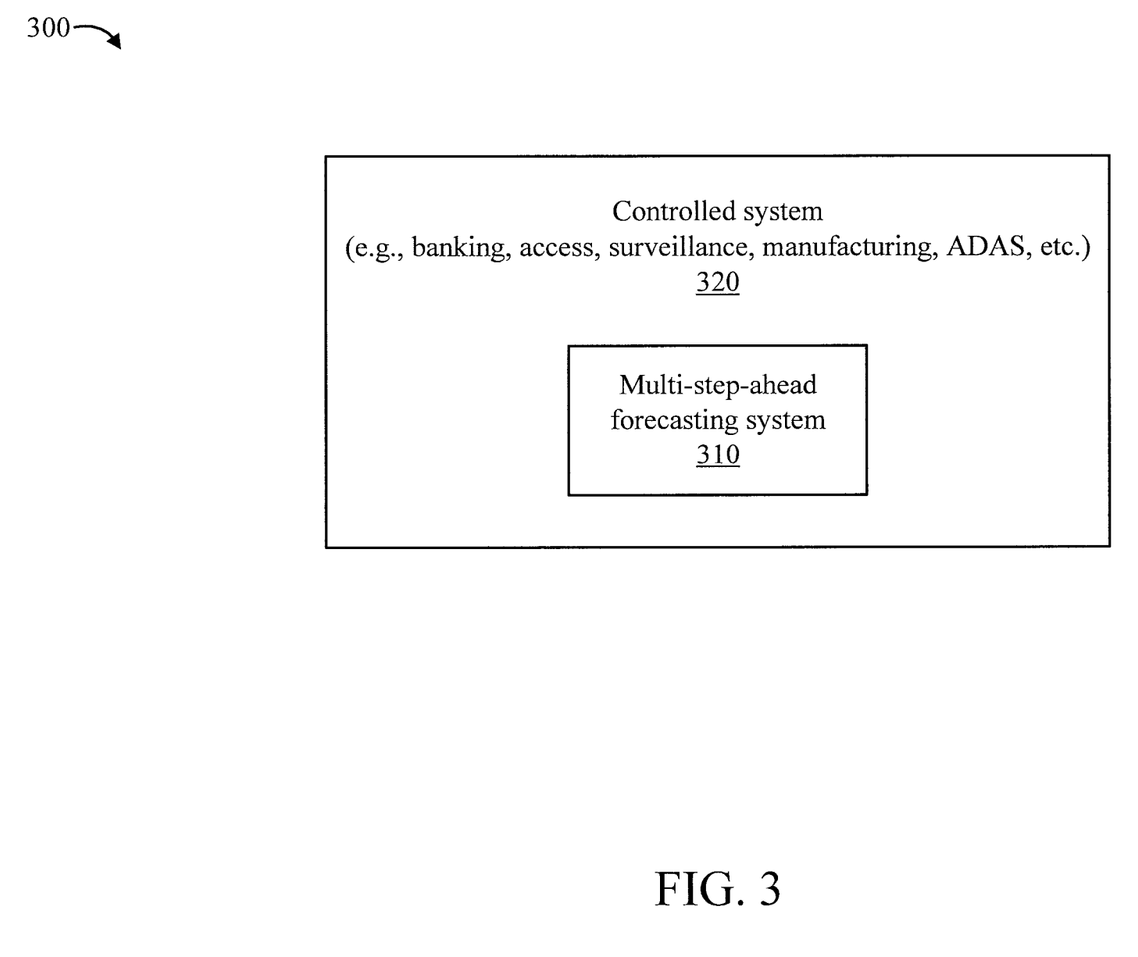
FIG. 3 is a block diagram showing another exemplary environment to which the present invention can be applied, in accordance with an embodiment of the present invention.

FIG. 3 is a block diagram showing another exemplary environment 300 to which the present invention can be applied, in accordance with an embodiment of the present invention.

The environment 300 includes a controlled system 320 that, in turn, includes a multi-step-ahead forecasting system 310. One or more communication buses and/or other devices can be used to facilitate inter-system, as well as intra-system, communication. The controlled system 320 can be any type of processor-based system such as, for example, but not limited to, a banking system, an access system, a surveillance system, a manufacturing system (e.g., an assembly line), an Advanced Driver-Assistance System (ADAS), and so forth.

Other than system 310 being included in system 320, operations of these elements in environments 200 and 300 are similar. Accordingly, elements 310 and 320 are not described in further detail relative to FIG. 3 for the sake of brevity, with the reader respectively directed to the descriptions of elements 210 and 220 relative to environment 200 of FIG. 2 given the common functions of these elements in the two environments 200 and 300.

The following designations apply herein:
x denotes a set of N multivariate observations;
t denotes a time step;
N denotes the $N^{th}$ multivariate observation;
n denotes a range from 1, . . . , N;
p denotes an observation number;
l denotes a loss (objective) function;
Re denotes a real portion of a complex-valued weight parameter;
b denotes an imaginary portion of a complex-valued weight parameter;
δ denotes a constant vector of linear time trend coefficients, with n elements; and
W denotes a weighting parameter.

The present invention is directed to an online algorithm for a complex-valued Vector Autoregression (VAR) model to learn and generate a N-step-ahead forecast as follows:

1. Multi-step cumulative error:
   Input: $x^{[t+N]}$, . . . , $x^{[t+1]}$, $x^{[t]}$, . . . , $x^{[t-p+1]}$
   l=0
   For n=1, . . . , N:
   $l+=(x^{[t+n]}-Re(b+\Sigma_{\delta=1,...,p}W^{[\delta]}x^{[t+n-\delta]})$
   $x^{[t+n]} \leftarrow b+\Sigma_{\delta=1,...,p}W^{[\delta]}x^{[t+n-\delta]}$
   Output: l 2. VAR with complex-valued weight parameters b, $W^{[\delta]}$ (δ=1, . . . , p)
   Learning method
   For t=1, 2, . . .
      Observe x[t+N] (assuming we already have $x^{[t+N-1]}$, . . . $x^{[t+1]}$, $x^{[t]}$, . . . , $x^{[t-p+1]}$
      Update weight parameters to the negative gradient of the multi-step cumulative error.
   Forecasting method
      Input: the recent p observations $x^{[t]}$, . . . , x[t-p+1]
      For n=1, . . . , N:
         $x^{[t+n]} \leftarrow b+\Sigma_{\delta=1,...,p}W^{[\delta]}x^{[t+n-\delta]}$
      Output: $Re(x^{[t+1]})$, . . . , $Re(x^{[t+N]})$ In the preceding with respect to the input of the multi-step cumulative error, the term Re (in the equation "$l+=(x^{[t+n]}-Re(b+\Sigma_{\delta=1,...,p}W^{[\delta]}x^{[t+n-\delta]}))^2$") is the prediction of $x^{[t+n]}$, and the term $x^{[t+n]}$ (in the equation "$x^{[t+n]} \leftarrow b+\Sigma_{\delta=1,...,p}W^{[\delta]}x^{[t+n-\delta]}$") is a function of b and $W^{[\delta]}$.

In the preceding with respect to the output (i.e., "$Re(x^{[t+1]})$, . . . , $Re(x^{[t+N]})$") of the Forecasting method, such output is taken from the real part, namely $Re(x^{[t+1]})$, etc.

Exemplary methods relating to the use of multi-step cumulative error are described below with respect to FIG. 4 as a standalone approach, and with respect to FIG. 6 in a hybrid approach. Exemplary methods relating to the use of multi-step cumulative error are described below with respect to FIG. 5 as a standalone approach, and with respect to FIG. 6 in a hybrid approach.

Figure 4:
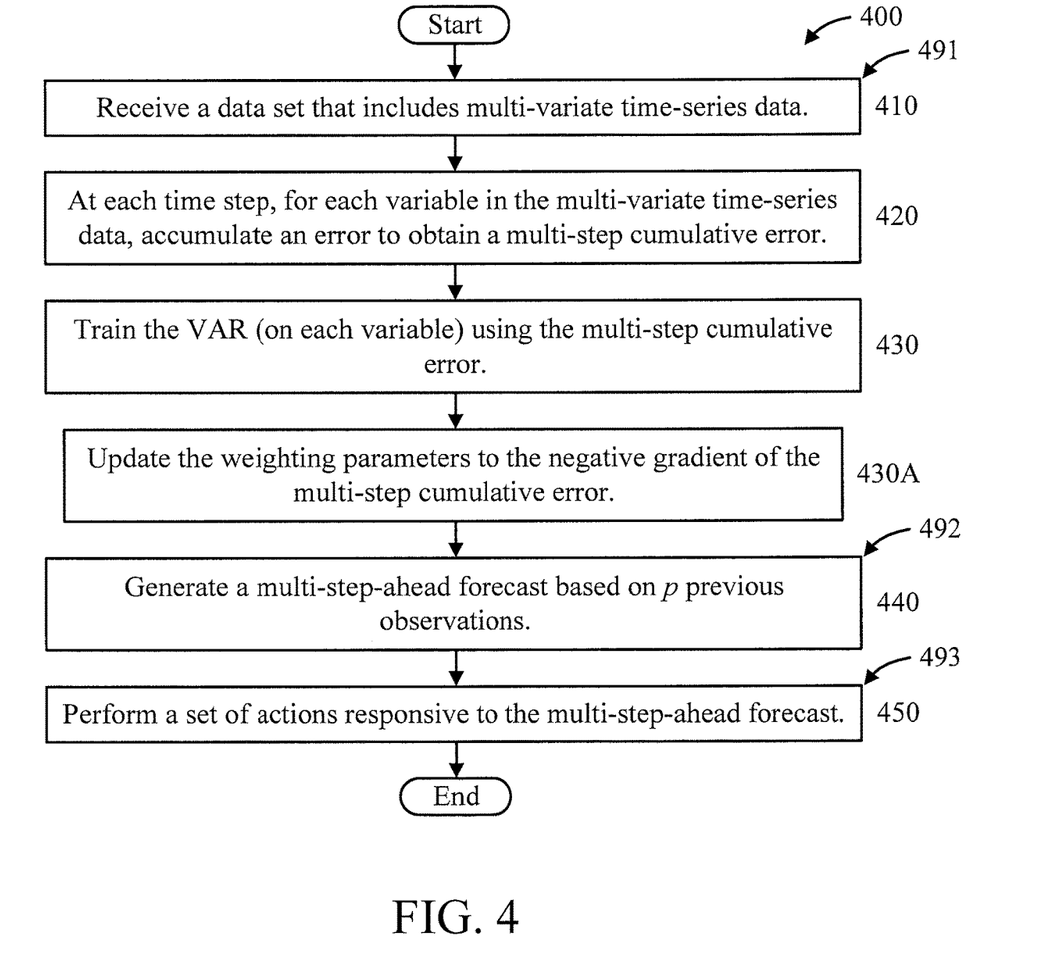
FIG. 4 is a flow diagram showing an exemplary method for multi-step-ahead forecast using a VAR configured to use a multi-step cumulative error, in accordance with an embodiment of the present invention.

FIG. 4 is a flow diagram showing an exemplary method 400 for multi-step-ahead forecast using a VAR configured to use a multi-step cumulative error, in accordance with an embodiment of the present invention. Method 400 can be considered to include a learning stage 491, an inference stage 492, and an action stage 493. The learning stage 491 corresponds to learning/training a VAR model. The inference stage 492 corresponds to generating a new multi-step-ahead forecast using the VAR model. The action stage 493 corresponds to performing an action responsive to a multi-step-ahead forecast generated by the inference stage 492. The learning stage 491 involves blocks 410 through 430, the inference stage involves block 440, and the action stage involves block 450.

At block 410, receive a data set that includes multi-variate time-series data (that is, a series of data points indexed in time order and involving multiple variables).

At block 420, at each time step t (where time step t=1, 2, . . . ), for each variable in the multi-variate time-series data, accumulate an error to obtain a multi-step cumulative error (across at least two or more time steps).

At block 430, train the VAR (on each variable) using the multi-step cumulative error.

In an embodiment, block 430 can include block 430A.

At block 430A, update the weight parameters to the negative gradient of the multi-step cumulative error. In specific, the gradient can be computed by backpropagation, using any of automatic differentiation tools or manual coding. The gradient is used to update the weight parameters so as to decrease the multi-step cumulative error. One embodiment uses any of stochastic gradient descent rules, that is, the weight parameters are updated by adding the negative gradient multiplied by a learning rate.

At block 440, generate a multi-step-ahead forecast based on p previous observations.

At block 450, perform a set of actions responsive to the multi-step-ahead forecast. As appreciated by one of ordinary skill in the art, the set of actions depends on the implementation. For example, depending upon the type of the controlled system, the action will vary from system type to system type, and so forth. Exemplary actions are described above with respect to FIG. 2.

Figure 5:
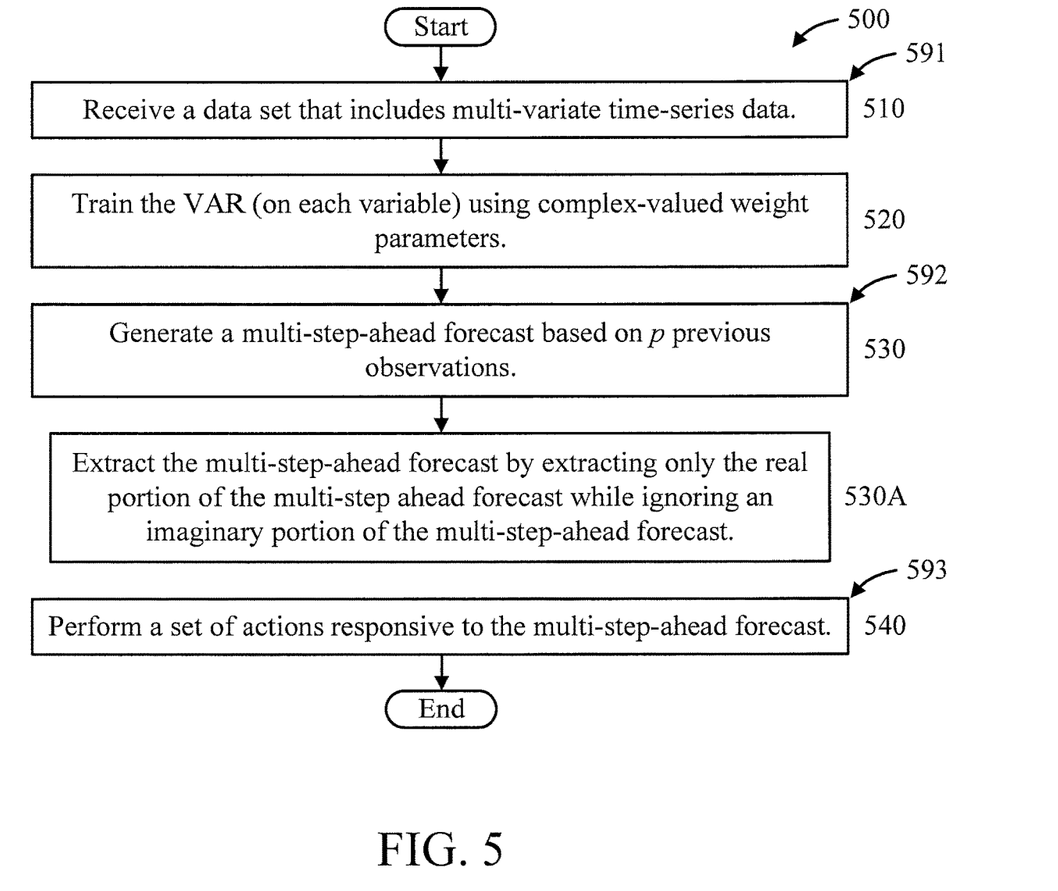
FIG. 5 is a flow diagram showing an exemplary method for multi-step-ahead forecast using a VAR configured to use complex-valued weight parameters, in accordance with an embodiment of the present invention.

FIG. 5 is a flow diagram showing an exemplary method 500 for multi-step-ahead forecast using a VAR configured to use complex-valued weight parameters, in accordance with an embodiment of the present invention. Method 500 can be considered to include a learning stage 591, an inference stage 592, and an action stage 593. The learning stage 591 corresponds to learning/training a VAR model. The inference stage 592 corresponds to generating a new multi-step-ahead forecast using the VAR model. The action stage 593 corresponds to performing an action responsive to a multi-step-ahead forecast generated by the inference stage 592. The learning stage 591 involves blocks 510 through 520, the inference stage involves block 530, and the action stage involves block 540.

At block 510, receive a data set that includes multi-variate time-series data (that is, a series of data points indexed in time order and involving multiple variables).

At block 520, train the VAR (on each variable) using complex-valued weight parameters error. The VAR can be trained online, in the same way as block 430A, or can be trained offline. In the offline learning algorithm, the multi-step cumulative errors are accumulated using the whole time-series, and the weight parameters are updated using the negative gradient of the accumulated errors, in the same way as block 430A.

At block 530, generate a multi-step-ahead forecast based on p previous observations.

In an embodiment, block 530 includes block 530A.

At block 530A, extract the multi-step-ahead forecast by extracting only the real portion of the multi-step ahead forecast while ignoring an imaginary portion of the multi-step-ahead forecast.

At block 540, perform a set of actions responsive to the multi-step-ahead forecast. As appreciated by one of ordinary skill in the art, the set of actions depends on the implementation. For example, depending upon the type of the controlled system, the action will vary from system type to system type, and so forth. Exemplary actions are described above with respect to FIG. 2.

Figure 6:
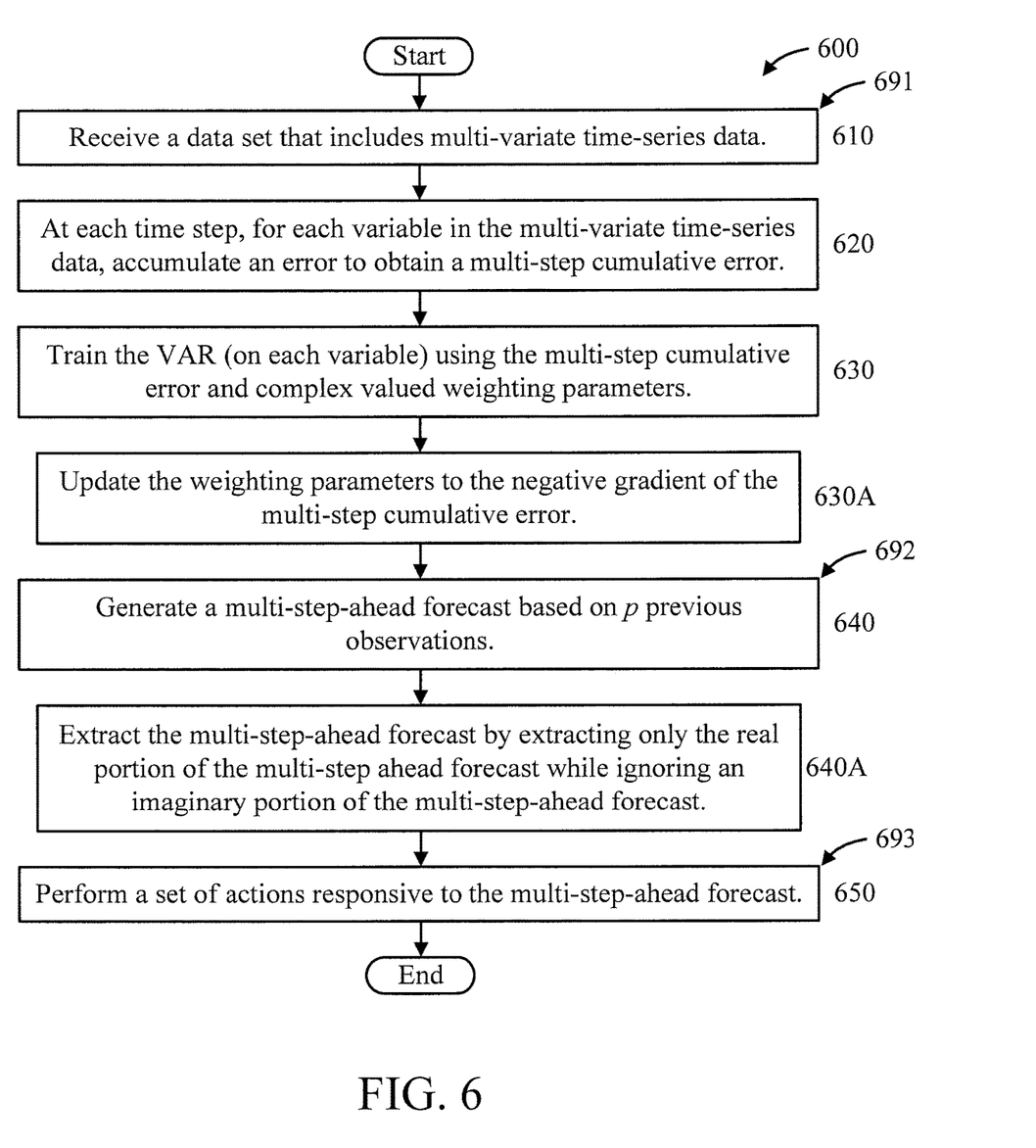
FIG. 6 is a flow diagram showing an exemplary method for multi-step-ahead forecast using a VAR configured to use a multi-step cumulative error and complex-valued weight parameters, in accordance with an embodiment of the present invention.

FIG. 6 is a flow diagram showing an exemplary method 600 for multi-step-ahead forecast using a VAR configured to use a multi-step cumulative error and complex-valued weight parameters, in accordance with an embodiment of the present invention. Method 600 can be considered to include a learning stage 691, an inference stage 692, and an action stage 693. The learning stage 691 corresponds to learning/training a VAR model. The inference stage 692 corresponds to generating a new multi-step-ahead forecast using the VAR model. The action stage 693 corresponds to performing an action responsive to a multi-step-ahead forecast generated by the inference stage 692. The learning stage 691 involves blocks 610 through 630, the inference stage involves block 640, and the action stage involves block 650.

At block 610, receive a data set that includes multi-variate time-series data (that is, a series of data points indexed in time order and involving multiple variables).

At block 620, at each time step t (where time step t=1, 2, . . . ), for each variable in the multi-variate time-series data, accumulate an error to obtain a multi-step cumulative error (across at least two or more time steps).

At block 630, train the VAR (on each variable) using the multi-step cumulative error.

In an embodiment, block 630 can include block 630A.

At block 630A, update the complex-valued weighting parameters to the negative gradient of the multi-step cumulative error.

At block 640, generate a multi-step-ahead forecast based on p previous observations.

In an embodiment, block 640 includes block 640A.

At block 640A, extract the multi-step-ahead forecast by extracting only the real portion of the multi-step ahead forecast while ignoring an imaginary portion of the multi-step-ahead forecast.

At block 650, perform a set of actions responsive to the multi-step-ahead forecast. As appreciated by one of ordinary skill in the art, the set of actions depends on the implementation. For example, depending upon the type of the controlled system, the action will vary from system type to system type, and so forth. Exemplary actions are described above with respect to FIG. 2.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
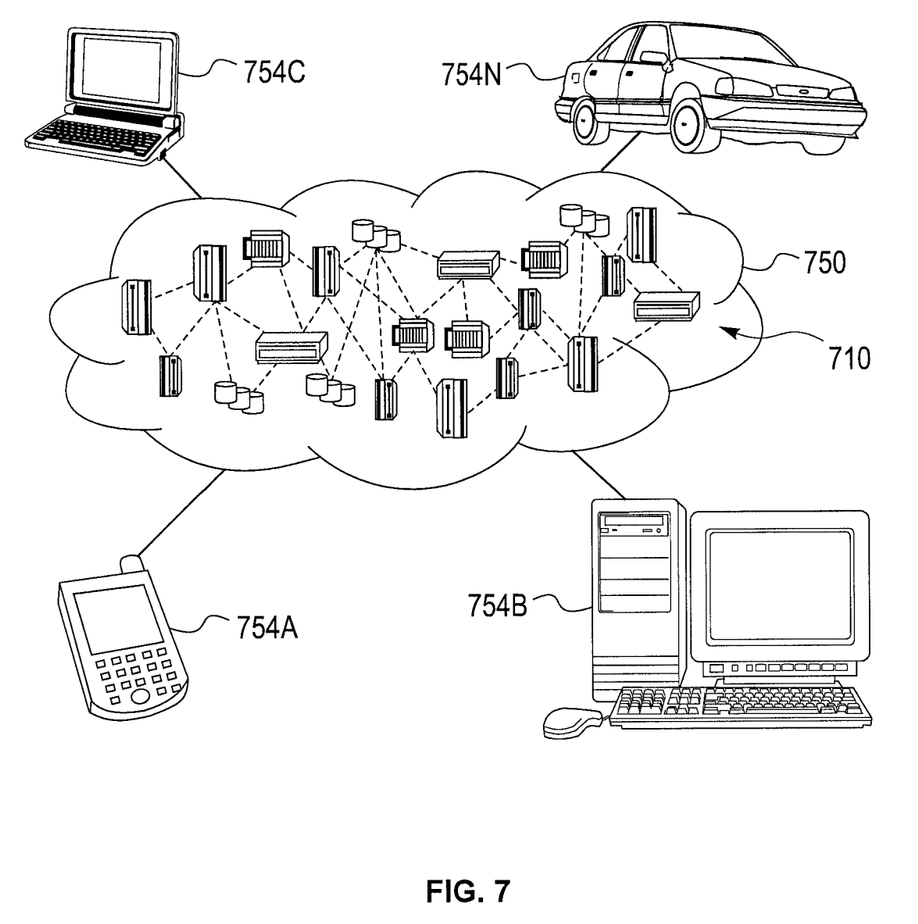
FIG. 7 is a block diagram showing an illustrative cloud computing environment having one or more cloud computing nodes with which local computing devices used by cloud consumers communicate, in accordance with an embodiment of the present invention.

Referring now to FIG. 7, illustrative cloud computing environment 750 is depicted. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
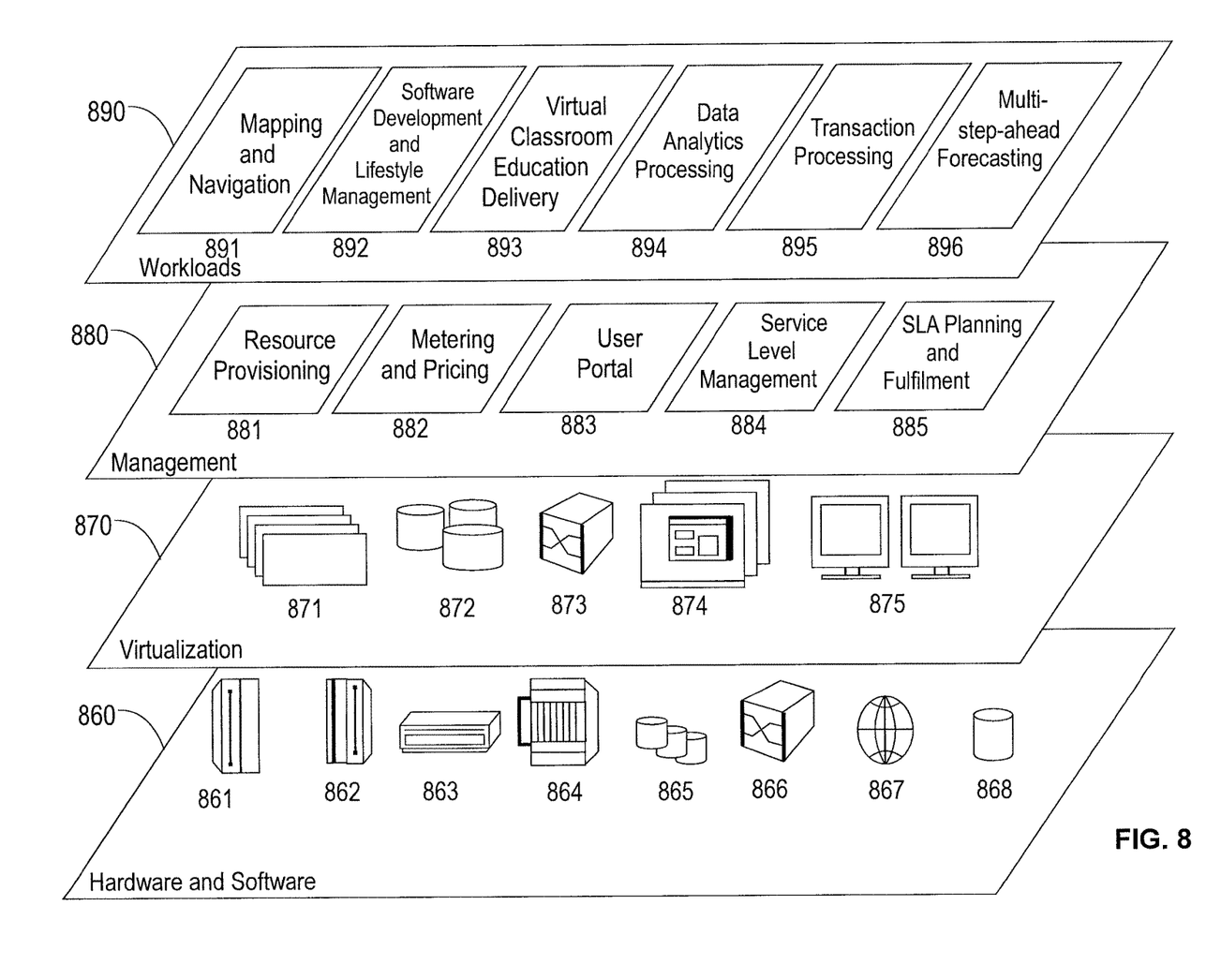
FIG. 8 is a block diagram showing a set of functional abstraction layers provided by a cloud computing environment, in accordance with an embodiment of the present invention.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and multi-step ahead forecasting using complex-valued vector autoregression 896.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for multi-step ahead forecasting, comprising:
    configuring, by a processor device, a Vector Autoregression (VAR) model to generate a multi-step-ahead forecast based on previous observations, where the previous observations are predictors and the multi-step-ahead forecast is a response to the predictors; and
    training, by the processor device, the VAR model using complex-valued weight parameters having real and imaginary values to avoid a training result relating to any of a divergence and a convergence to zero, the imaginary values used as inputs to the VAR model to generate successive predictions while only the real values are output from the VAR model without the imaginary values as the successive predictions.

2. The computer-implemented method of claim 1, wherein the multi-step-ahead forecast is generated further based on a multi-step cumulative error.

3. The computer-implemented method of claim 1, wherein said training step comprises learning the VAR model using a multi-step cumulative error as an objective function of the VAR model.

4. The computer-implemented method of claim 3, wherein the multi-step cumulative error accumulates an error of at least one variable of the VAR model across multiple time steps.

5. The computer-implemented method of claim 3, wherein said learning step updates the complex-valued weight parameters to a negative gradient of the multi-step cumulative error.

6. The computer-implemented method of claim 1, wherein an output of the VAR model is taken from a real portion of a complex-valued output from the VAR model, while ignoring an imaginary portion of the complex-valued output from the VAR model.

7. The computer-implemented method of claim 1, further comprising performing an inference step to generate a final version of the multi-step-ahead forecast based on a set of previous observations by extracting only a real portion of the multi-step ahead forecast without an imaginary portion.

8. The computer-implemented method of claim 1, further comprising controlling an operation of an assembly line machine to avoid an impending predicted failure, responsive to the multi-step-ahead forecast.

9. The computer-implemented method of claim 1, wherein the VAR model is trained using a loss function having complex-valued weight parameters with an imaginary term.

10. The computer-implemented method of claim 1, wherein each of the predictors include a respective real portion and a respective imaginary portion, and wherein the multi-step ahead forecast is based only on the respective real portion of the predictors.

11. A computer program product for multi-step ahead forecasting, the computer program product comprising a non-transitory computer readable storage medium having program instructions embodied therewith, the program instructions executable by a computer to cause the computer to perform a method comprising:
    configuring, by a processor device, a Vector Autoregression (VAR) model to generate a multi-step-ahead forecast based on previous observations, where the previous observations are predictors and the multi-step-ahead forecast is a response to the predictors; and
    training, by the processor device, the VAR model using complex-valued weight parameters having real and imaginary values to avoid a training result relating to any of a divergence and a convergence to zero, the imaginary values used as inputs to the VAR model to generate successive predictions while only the real values are output from the VAR model without the imaginary values as multi-step-ahead forecasts as the successive predictions.

12. The computer program product of claim 11, wherein the multi-step-ahead forecast is generated further based on a multi-step cumulative error.

13. The computer program product of claim 11, wherein said training step comprises learning the VAR model using a multi-step cumulative error as an objective function of the VAR model.

14. The computer program product of claim 13, wherein the multi-step cumulative error accumulates an error of at least one variable of the VAR model across multiple time steps.

15. The computer program product of claim 13, wherein said learning step updates the complex-valued weight parameters to a negative gradient of the multi-step cumulative error.

16. The computer program product of claim 11, wherein an output of the VAR model is taken from a real portion of a complex-valued output from the VAR model, while ignoring an imaginary portion of the complex-valued output from the VAR model.

17. The computer program product of claim 11, wherein the method further comprises performing an inference step to generate a final version of the multi-step-ahead forecast based on a set of previous observations by extracting only a real portion of the multi-step ahead forecast without an imaginary portion.

18. The computer program product of claim 11, wherein the method further comprises controlling an operation of an assembly line machine to avoid an impending predicted failure, responsive to the multi-step-ahead forecast.

19. The computer program product of claim 11, wherein the VAR model is trained using a loss function having complex-valued weight parameters with an imaginary term.

20. The computer program product of claim 11, wherein each of the predictors include a respective real portion and a respective imaginary portion, and wherein the multi-step ahead forecast is based only on the respective real portion of the predictors.

21. A computer processing system for multi-step ahead forecasting, comprising:
a memory device for storing program code; and
a processor device for running the program code to
configure a Vector Autoregression (VAR) model to generate a multi-step-ahead forecast based on previous observations, where the previous observations are predictors and the multi-step-ahead forecast is a response to the predictors; and
train the VAR model using complex-valued weight parameters having real and imaginary values to avoid a training result relating to any of a divergence and a convergence to zero, the imaginary values used as inputs to the VAR model to generate successive predictions while only the real values are output from the VAR model without the imaginary values as multi-step-ahead forecasts as the successive predictions.

22. The computer processing system of claim 21, wherein the computer processing system is comprised in an Advanced Driver-Assistance System, and the processor device is further configured to perform an action on a controlled motor vehicle to avoid one or more obstacles responsive to the multi-step-ahead forecast.

23. A computer-implemented method for multi-step-ahead forecasting, comprising:
configuring, by a processor device, a Vector Autoregression (VAR) model to generate a multi-step-ahead forecast based on previous observations, where the previous observations are predictors and the multi-step ahead forecast is the response to the predictors;
learning, by the processor device, the VAR model using a multi-step cumulative error as an objective function of the VAR model; and
training the VAR model using complex-valued weight parameters having real and imaginary values to avoid a training result relating to any of a divergence and a convergence to zero, the imaginary values used as inputs to the VAR model to generate successive predictions while only the real values are output from the VAR model without the imaginary values as multi-step-ahead forecasts as the successive predictions.

24. A non-transitory article of manufacture tangibly embodying a computer readable program which when executed causes a computer to perform the steps of claim 23.

25. A computer processing system for multi-step-ahead forecasting, comprising:
a memory for storing program code; and
a processor device for running the program code to
configure a Vector Autoregression (VAR) model to generate a multi-step-ahead forecast based on previous observations, where the previous observations are predictors and the multi-step ahead forecast is the response to the predictors;
learn the VAR model using a multi-step cumulative error as an objective function of the VAR model; and
training the VAR model using complex-valued weight parameters having real and imaginary values to avoid a training result relating to any of a divergence and a convergence to zero, the imaginary values used as inputs to the VAR model to generate successive predictions while only the real values are output from the VAR model without the imaginary values as multi-step-ahead forecasts as the successive predictions.

* * * * *